US012599788B2

(12) United States Patent
Stroshane et al.

(10) Patent No.: US 12,599,788 B2
(45) Date of Patent: Apr. 14, 2026

(54) ROPE GRAB

(71) Applicant: Sherrill, Inc., Greensboro, NC (US)

(72) Inventors: Alexander P Stroshane, Gorham, ME (US); Caitlin J Wood, Westbrook, ME (US)

(73) Assignee: Sherrill, Inc., Greensboro, NC (US)

( * ) Notice: Subject to any disclaimer, the term of this patent is extended or adjusted under 35 U.S.C. 154(b) by 1057 days.

(21) Appl. No.: 17/576,186

(22) Filed: Jan. 14, 2022

(65) Prior Publication Data

US 2023/0226382 A1 Jul. 20, 2023

(51) Int. Cl.
*A62B 1/14* (2006.01)
*A62B 35/04* (2006.01)
*A63B 29/02* (2006.01)

(52) U.S. Cl.
CPC ................ *A62B 1/14* (2013.01); *A62B 35/04* (2013.01); *A63B 29/02* (2013.01)

(58) Field of Classification Search
CPC ........ A62B 1/14; A63B 29/02; Y10T 24/3944
USPC ............................. 182/5, 192, 193; 188/65.5
See application file for complete search history.

(56) References Cited

U.S. PATENT DOCUMENTS 5,156,240 A * 10/1992 Ostrobrod ................ A62B 1/14 188/65.1
5,597,052 A * 1/1997 Rogleja .................... A62B 1/14 182/5
6,378,650 B2 4/2002 Mauthner
8,733,504 B2 5/2014 Mauthner
10,035,028 B1 * 7/2018 Siegel ...................... A62B 1/06
2003/0075392 A1 * 4/2003 Rogelja .................... A62B 1/14 188/65.5
2006/0070809 A1 * 4/2006 Barzilai .................... E06B 7/28 182/5
(Continued)

FOREIGN PATENT DOCUMENTS

EP 0398819 A1 11/1990
FR 2626184 A * 7/1989 ............... A62B 1/14
(Continued)

OTHER PUBLICATIONS

ART GmbH, Positioner 2 Manual, Sep. 2020.
(Continued)

*Primary Examiner* — Ryan D Kwiecinski
(74) *Attorney, Agent, or Firm* — Altman & Martin; Steven K Martin

(57) ABSTRACT

The rope grab uses friction to control movement along the rope. A brake has an eye at one end and a foot at the other that extends away at an angle to a rounded toe. Optionally, the eye and foot are attached so as to swivel. A cam has an oval rocker and a lever that extends from the rocker opposite the rocker surface. The rocker surface curves eccentrically about an axis, so the rocker behaves like a cam to modulate friction on the rope. The rope extends through a slot and is pinched between an operative surface of the rocker surface and the toe. The brake and cam are held in the correct position relative to each other between two parallel walls of a housing with the eye and lever extending in generally opposite directions outside the housing. Optional springs bias the brake toe and operative surface into the slot.

19 Claims, 19 Drawing Sheets

(56) References Cited

U.S. PATENT DOCUMENTS

| | | | | |
|---|---|---|---|---|
| 2010/0126802 | A1* | 5/2010 | Delaittre | A62B 1/14 182/133 |
| 2012/0103725 | A1* | 5/2012 | Johansson | A62B 1/14 182/5 |
| 2016/0130875 | A1* | 5/2016 | Hwang | A62B 1/14 182/5 |
| 2016/0258457 | A1* | 9/2016 | Moine | F16B 2/185 |
| 2018/0340592 | A1* | 11/2018 | Truesdell | F16G 11/146 |
| 2019/0351264 | A1* | 11/2019 | Ratalino | A62B 1/14 |
| 2024/0359040 | A1* | 10/2024 | Stroshane | F16D 63/008 |
| 2025/0032824 | A1* | 1/2025 | Coates | A62B 1/14 |

FOREIGN PATENT DOCUMENTS

| | | | | |
|---|---|---|---|---|
| FR | 2717700 | A1 * | 9/1995 | A62B 1/14 |
| FR | 2904564 | A1 * | 2/2008 | A62B 1/14 |
| GB | 2566574 | A * | 3/2019 | E06C 7/186 |
| WO | 03/092816 | A1 | 11/2002 | |
| WO | WO-2010132012 | A1 * | 11/2010 | A62B 1/14 |
| WO | WO-2015074105 | A1 * | 5/2015 | A62B 35/0068 |

OTHER PUBLICATIONS

"Lever-Cam Rope Grabs," ArbClimber, Issue 18, pp. 38-53.
Petzl International, Grillon Manual, Jun. 24, 2021.
Petzl International, Grillon Rope Replacement Manual, Nov. 16, 2018.
Extended European Search Report for Application No. 23151533.9 dated Jun. 16, 2023.

* cited by examiner

ROPE GRAB

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to descending by a rope, more particularly, to a device for controlling descent by rope.

2. Description of the Related Art

Arborists and other tree workers who perform work at height utilize fall restraint systems by securing themselves to the trees using combinations of ropes, cords, and hardware. When using saws or other cutting tools, arborists secure themselves with at least two points of attachment, often by employing a primary working line and a shorter lanyard. It is necessary to adjust the length of a lanyard to properly position the arborist to do their work, either by letting out slack to move away or taking up slack to move closer to the anchor point. It is preferable to make this adjustment with one hand, in a controlled manner, and without needing to fully unload the system, which can create slack in the rope and increase the chance of a dangerous fall.

Significant work has been done in the tree care industry to improve the ease and ergonomics of taking up or letting out slack in the rope and to increase efficiency and safety for these systems. Original methods include using smaller cords in loop or eye-to-eye configurations, along with a carabiner, to tie hitches around the main rope or lanyard. These hitch cords can slide along the main rope or lanyard, then cinch on when weight is applied to hold their position. Typically, their grip can be released by compressing the coiled cord, allowing it to slide once again. Such systems allow for modulating the amount of friction and maintaining control when extending the system but wear out more quickly than most hardware-on-rope systems. They also add significant drag when taking up slack in the rope, especially if still holding any of the arborist's body weight and require additional tending hardware like a pulley when ascending a rope. A major concern with the use of hitches is that they require knowledge to tie correctly and to modify or adjust the configuration for the user's specific requirements.

Hardware designs that emulate the function of a hitch cord have continually improved the ease of taking up slack, but at the expense of an abrupt release of friction and reduced control when letting out. Some devices require the system to be unloaded before adjusting or require the arborist to apply additional friction by gripping the rope with a gloved hand to control the speed of adjustment. Such limitations create an impediment to efficient work and can furthermore compromise safety because of their reliance on exercising proper technique.

BRIEF SUMMARY OF THE INVENTION

The rope grab of the present invention uses friction on a rope to control movement along the rope. The rope grab has a brake, cam, and housing.

The brake is a beam with an axis that has an eye at one end and a foot at the other. Optionally, the eye and foot are attached so as to swivel with respect to each other on the axis. The foot extends away at an angle to the axis to a rounded toe. Optionally, the toe is textured to provide more friction with the rope. Optionally, the bottom of the foot has an elongated shallow rounded cutout that centers the rope. Optionally, the toe is on a separable component so that toes with different characteristics can be used.

The cam has a generally oval rocker and a lever that extends radially from the side of the rocker opposite the rocker surface. The outer surface of the rocker curves about an axis in the rocker. Optionally, the rocker surface has a shallow rounded groove to both center the rope and to cradle more of the rope for more contact area with the rope. The curve of the outer rocker surface is eccentric about the axis, which makes the rocker behave like a cam. The half of the outer rocker surface adjacent to the toe is the operative surface. The rope is pinched between the operative surface and the toe. Optionally, the rocker surface is on a removable cap that fits over a rocker base on the rocker. Both ends of the surface independently operate as the operative surface depending on the orientation of the cap.

The brake and cam are held in the correct position relative to each other between two parallel walls of the housing. The brake pivots on a brake axis and the cam pivots on the parallel cam axis. The eye and lever extend in generally opposite directions outside the housing. The toe and operative surface form a rope slot therebetween. Optional springs bias the brake toe and operative surface into the slot. Optionally, the one of the walls can be rotated to provide access to the slot.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

Figure 1:
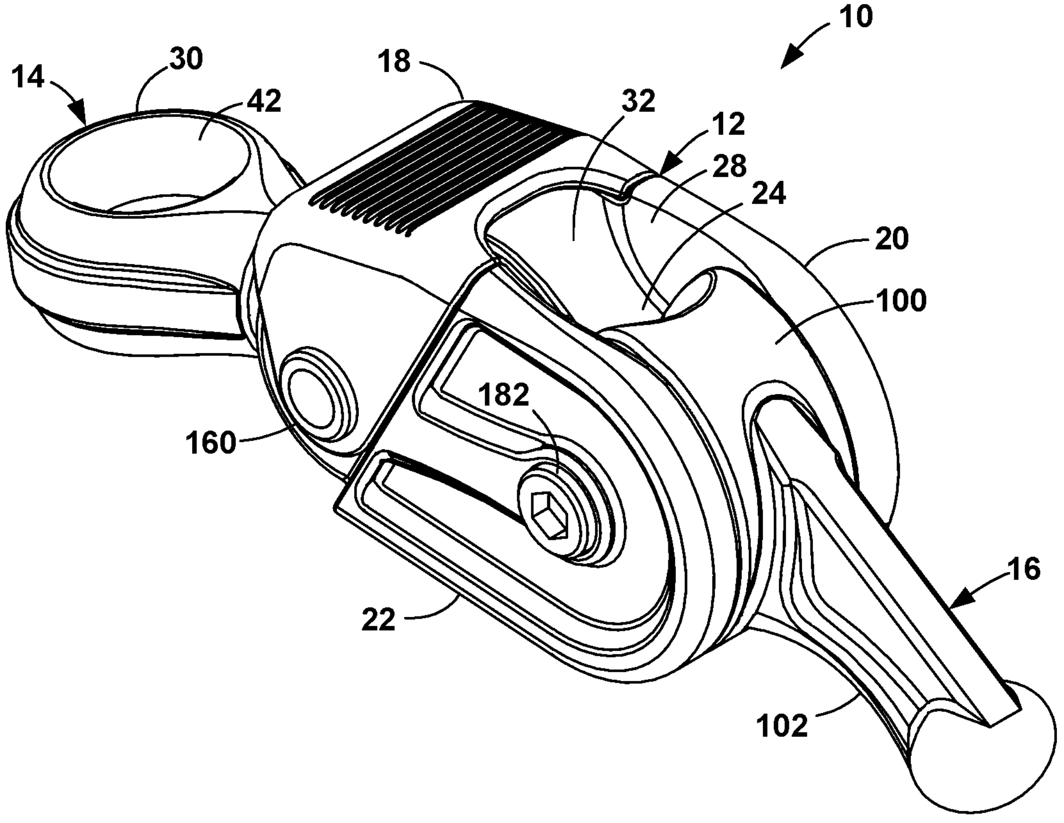
FIG. 1 is a perspective view of the rope grab of the present invention.
Figure 2:
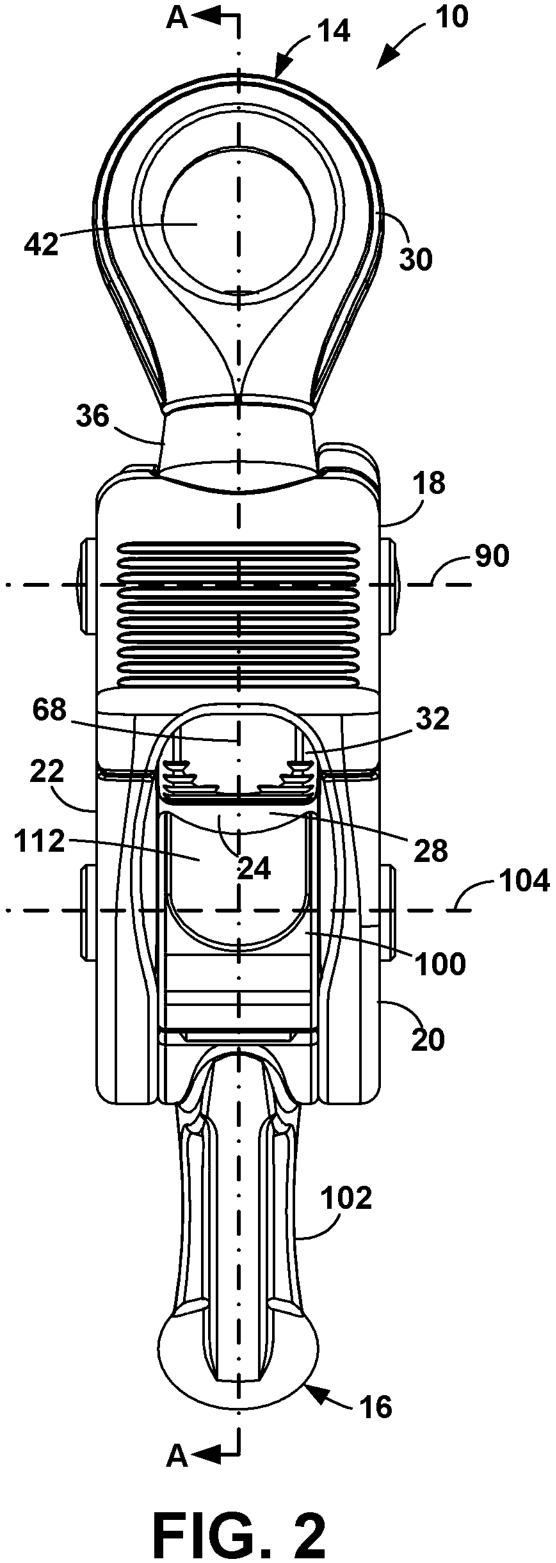
FIG. 2 is a top view of the rope grab.
Figure 3:
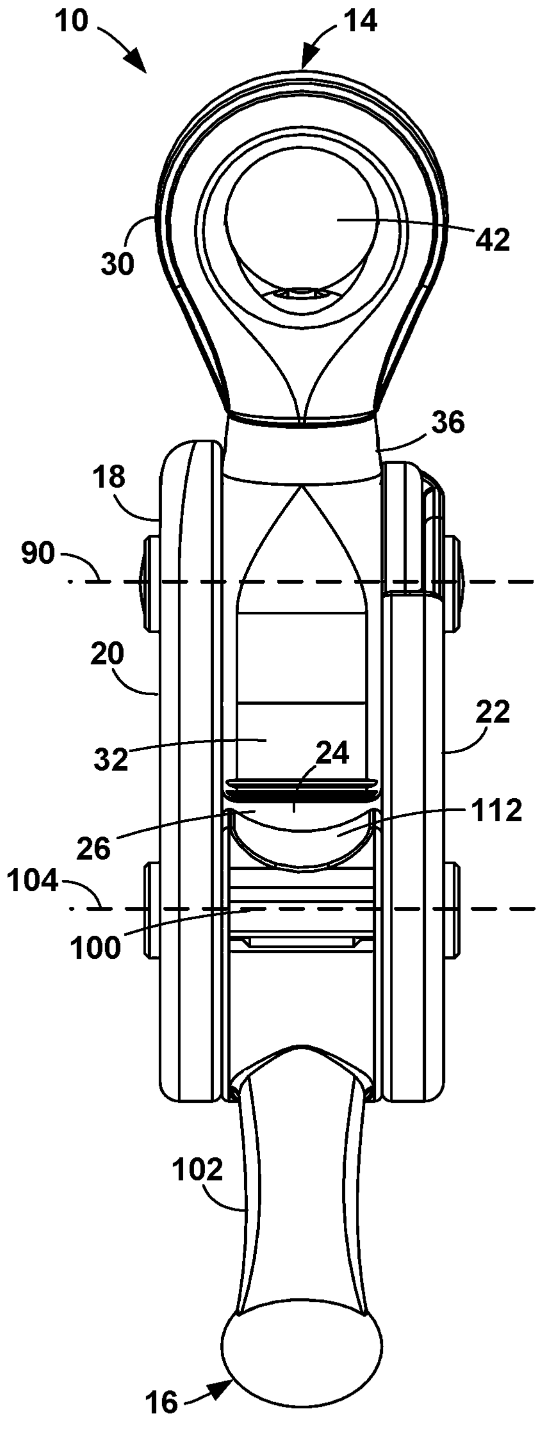
FIG. 3 is a bottom view of the rope grab.

The rope grab 10 of the present invention uses friction on a rope to control movement along the rope. As shown in FIGS. 1-8, it has a housing 12, a brake 14, and a cam 16.

The brake 14, shown in FIGS. 9-12, is a beam 36 with a beam axis 38 that has an eye 30 at an eye end 46 and a foot 32 at a foot end 64. The eye 30 is generally round with flattened sides 40 parallel to the beam axis 38 and a through hole 42 extending between the sides 40 perpendicular to the beam axis 38. The surface 44 of the hole 42 is rounded, as in FIG. 12, so that it is smooth and without sharp edges to catch or abrade a rope or carabiner.

Figure 12:
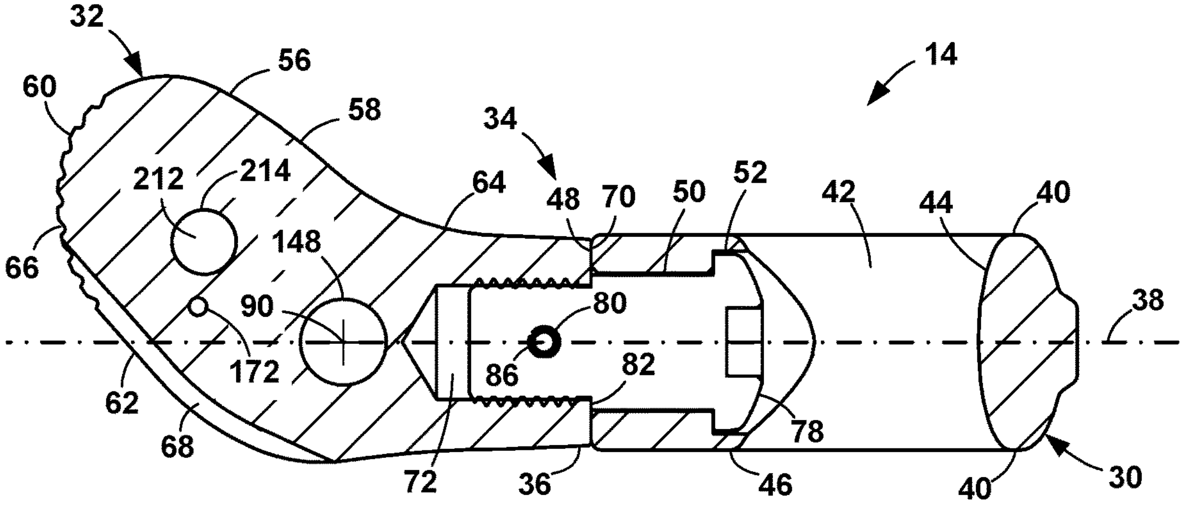
FIG. 12 is a side, partial cross-sectional view of the brake.
Figure 13:
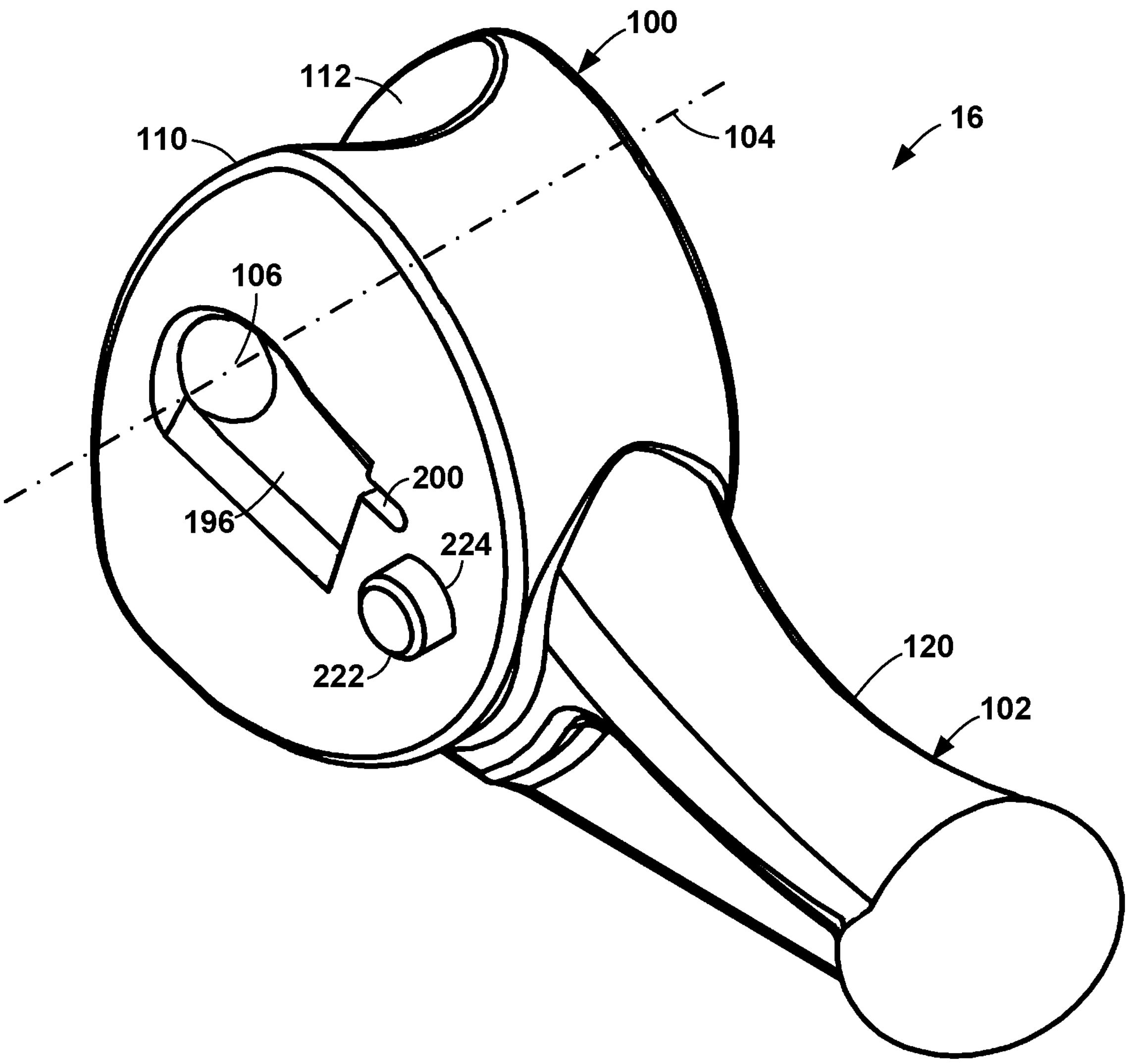
FIG. 13 is a perspective view of a fixed configuration of the cam.

The foot 32 extends away from the foot end 64 of the beam 36 at an approximately 48° angle to the beam axis 38, as shown in FIG. 12. Any angle in the range of 40° to 60° is contemplated by the present invention. The foot 32 is generally oval with flat sides 54 and an outer perimeter brake surface 56. The brake surface 56 has a top 58 extending away from the beam axis 38, a rounded toe 60 opposite the beam 36, and a bottom 62 extending through the beam axis 38 and generally (within 10°) parallel to the top 58. Optionally, the toe 60 is textured, as at 66, to better apply pressure to a rope when a force pulls on the eye, as described below. In the illustrated configuration, the texturing includes lateral ridges 94. Optionally, the bottom 62 has an elongated shallow rounded cutout 68 extending between the toe 60 and the beam 36 that centers the rope and provides a smooth surface for the rope to slide along when the brake 14 is released, as described below.

Figure 10:
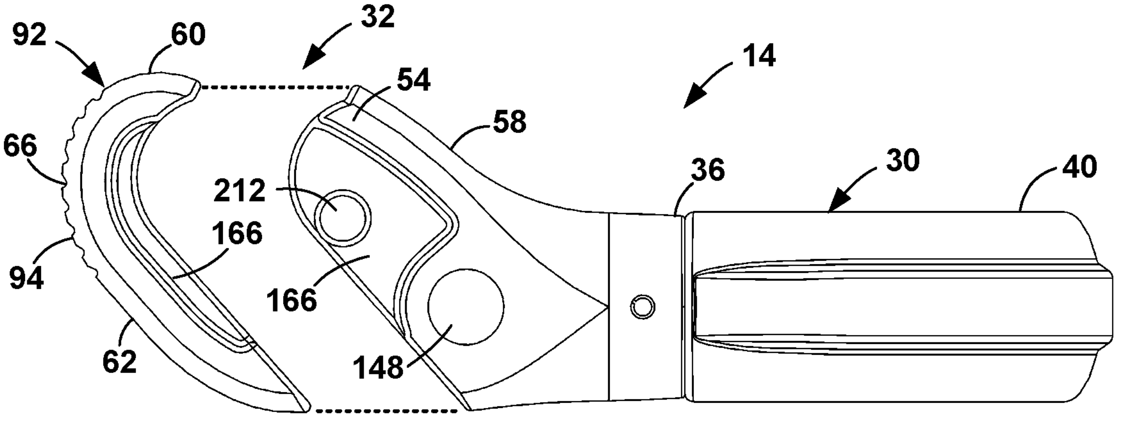
FIG. 10 is an exploded view of the foot with an interchangeable toe.
Figure 11:
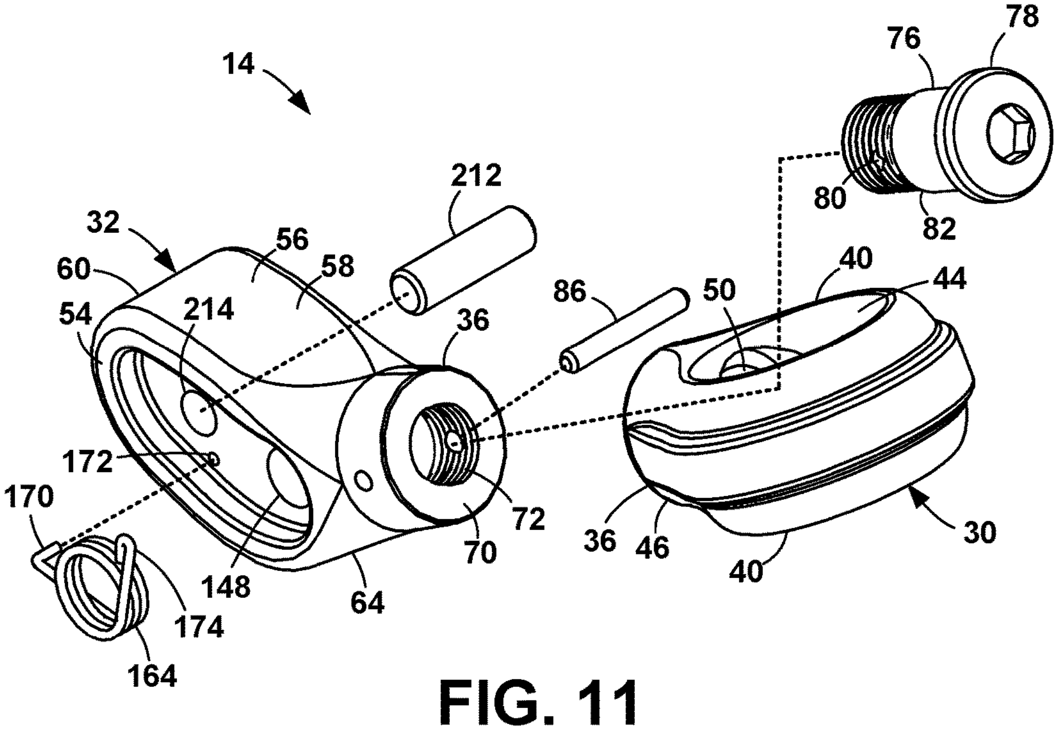
FIG. 11 is an exploded view of the brake.

Optionally, the foot 32 is constructed so that the toe 60 is on a separable component 92, as in FIG. 10, allowing it to be interchanged with toes having a differently shaped surfaces 56 and/or textures 66 in order to change the amount of braking pressure.

Optionally, the eye 30 and foot 32 are attached so as to swivel with respect to each other on the beam axis 38. Any acceptable swivel 34 can be implemented. In the illustrated swivel 34, shown in FIG. 12, the beam 36 is split radially to form an eye flat surface 44 and a foot flat surface 70 that abut each other. An eye aperture 50 extends along the beam axis 38 between the hole surface 44 and the eye flat surface 48. The eye aperture 50 is countersunk at the hole surface 44, as at 52. An aligned threaded foot aperture 72 extends along the beam axis 38 from the foot flat surface 70 toward the foot 32. A bolt 76 extends through the eye aperture 50 and turns into the threaded foot aperture 72. The bolt head 78 fits into the countersink 52. Optionally, a pin 86 extends radially through holes 74 in the beam 36 and an aligned hole 80 in the bolt 76 in order to prevent the bolt 76 from turning.

Optionally, the foot aperture 70 has a smaller diameter than the eye aperture 50 and the bolt 76 has a corresponding difference in diameter separated by a shoulder 82. The shoulder 82 abuts the foot flat surface 70. The shoulder 82 against the brake flat surface 70 keeps the bolt 76 from clamping the flat surfaces 48, 70 together, which would lock up the swivel 34.

The cam 16, shown in FIGS. 13-21, has a generally oval rocker 100 at the end of a lever 102. The outer rocker surface 110 of the rocker 100 curves about an axis 104 in the rocker 100, as described below. Optionally, the rocker surface 110 has a shallow rounded groove 112 to both center the rope 3 and to cradle more of the rope 3 for more contact area with the rope 3.

The lever 102 extends radially from the side of the rocker 100 opposite the rocker surface 110. The lever 102 is generally straight. Optionally, it is curved, as at 120, for ergonomics and/or avoiding interference with the rope.

The curve of the outer rocker surface 110 is eccentric about the axis 104 of the rocker 100, which makes the rocker 100 behave like a cam. The half of the outer rocker surface 110 adjacent to the toe 60 is the operative surface 138 of the outer rocker surface 110. The rope 3 is pinched between the operative surface 138 and the toe 60, as described below.

Optionally, the rocker 100 is designed to operate with ropes of different structures (diameters and/or constructions). To that end, in one changeable configuration, the rocker surface 110 is on a removable cap 124, as in FIGS. 14 and 15. The cap 124 fits over a rocker base 126 on the rocker 100. The sides 128 of the cap 124 have slots 130 that straddle the axis 104.

The cap 124 is secured to the rocker base 126 by whatever means works. In the illustrated configuration, the cap 124 is secured by the mechanism that pivotally mounts the cam 16 to the housing 12, as described below.

The eccentricity of the surface 110 is such that both ends 116, 118 of the surface 110 independently operate as the operative surface 138 depending on the orientation of the cap 124. The end 116, 118 that is adjacent to the toe 60 is the operative surface 138.

Optionally, the rocker base 126 has a rocker base surface 132 with a similar curvature as the cap rocker surface 110. When the cap 124 is not installed, the operative surface 138 is on the rocker base surface 132.

Optionally, each end 116, 118 of the cap rocker surface 110 is shaped for ropes of different structures. At the end 116 for a larger rope, the operative surface 138 is closer to the axis 104, as in FIG. 16. At the end 118 for the smaller rope, the operative surface 138 is farther from the axis 104, as in FIG. 17. To change from one rope structure to the other, the cap 124 is removed, reversed, and reinstalled. Optionally, there can be several caps 124 to swap out for different rope structures.

Figure 18:
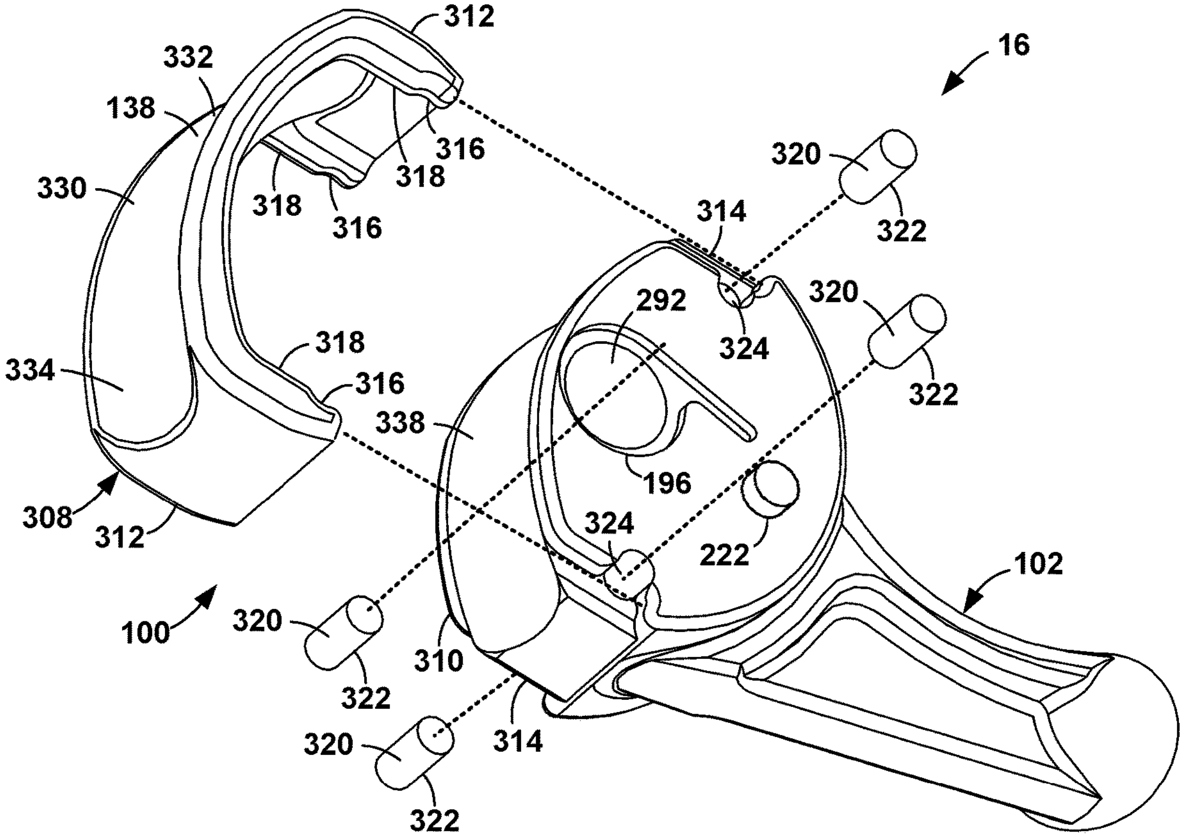
FIG. 18 is an exploded view of another configuration of an adjustable configuration of the cam.

A second changeable configuration is shown in FIG. 18. The rocker surface is on a removable cap 308, as at 330, that snaps onto a rocker base 310. The ends 312 of the cap 308 extend nearly parallel to each other and straddle the ends 314 of the rocker base 310.

The cap 308 is attached to the rocker base 310 by whatever means works. In the illustrated configuration, notches 316 on the edges 318 of the cap ends 312 snap onto cylindrical surfaces 320 extending from the rocker base ends 314. In the present design, the cylindrical surfaces 320 are on dowels 322 that are attached to the rocker base 310 in holes 324. Alternatively, the cylindrical surfaces 320 can be molded as part of the rocker base 310.

The eccentricity of the surface 330 is such that both ends 332, 334 of the surface 330 independently operate as the operative surface 138 depending on the orientation of the cap 308. The end 332, 334 that is adjacent to the toe 60 is the operative surface 138.

Figure 14:
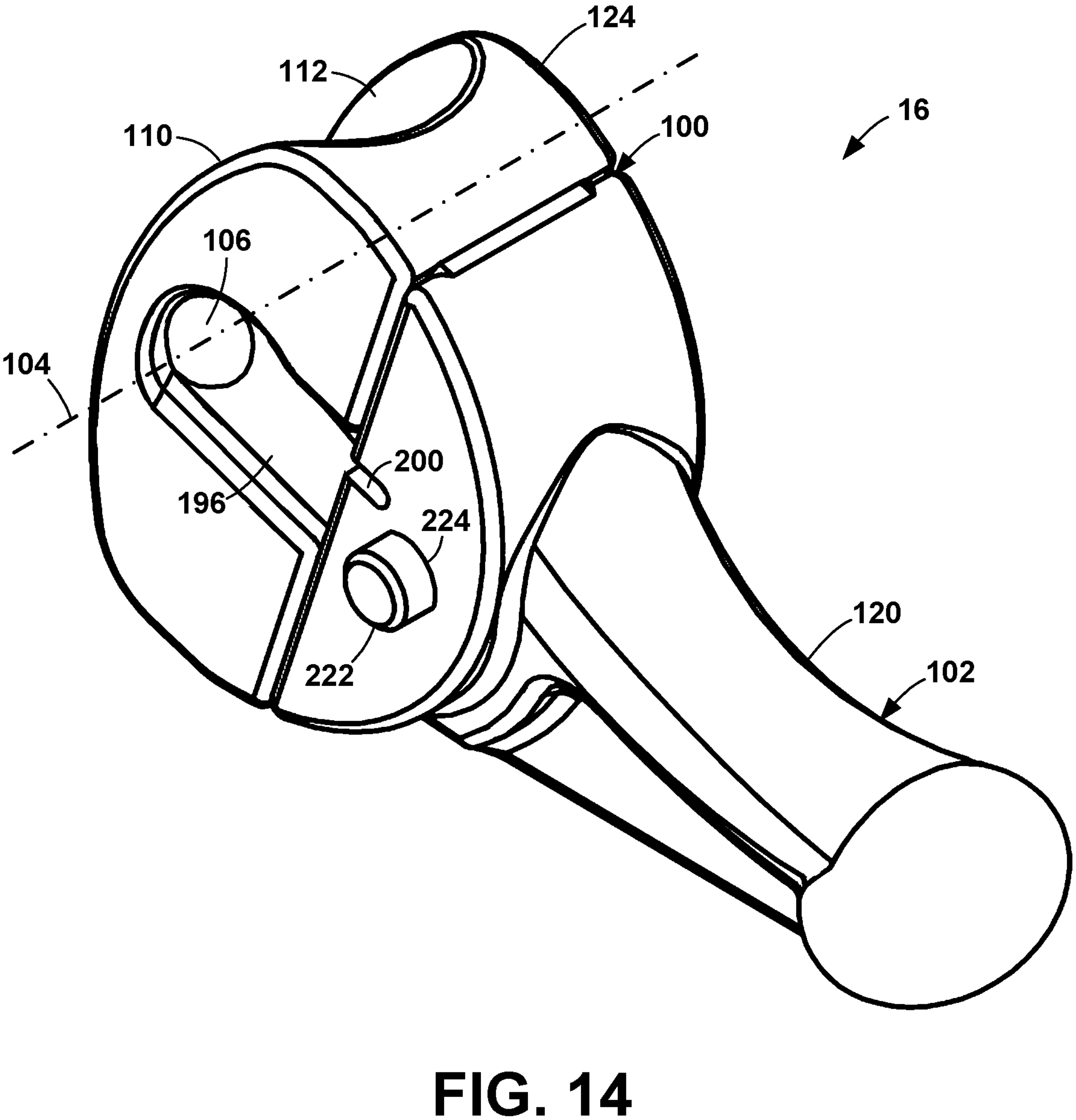
FIG. 14 is a perspective view of one configuration of an adjustable configuration of the cam.
Figure 15:
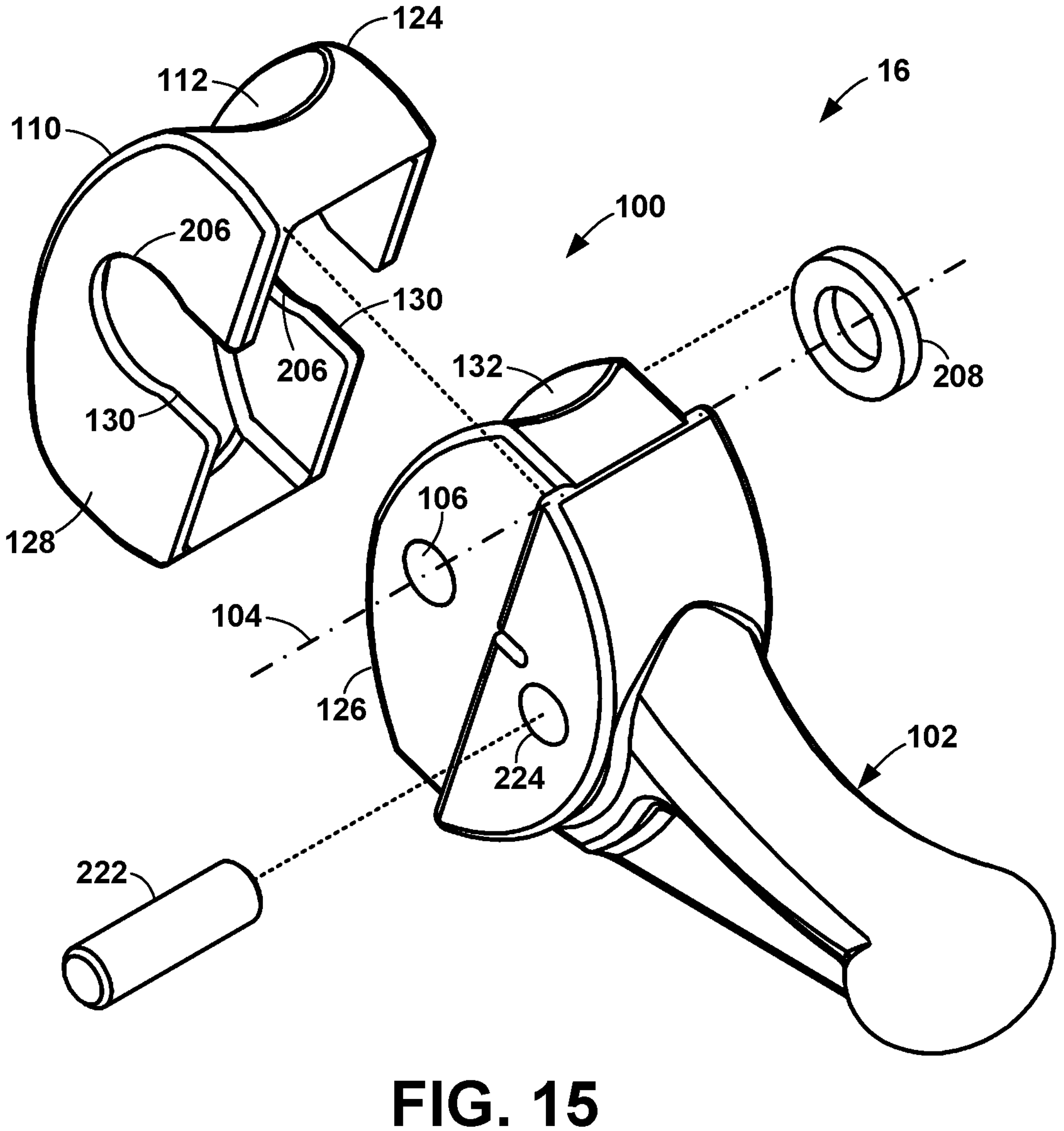
FIG. 15 is an exploded view of the of the adjustable cam of FIG. 14.
Figure 16:
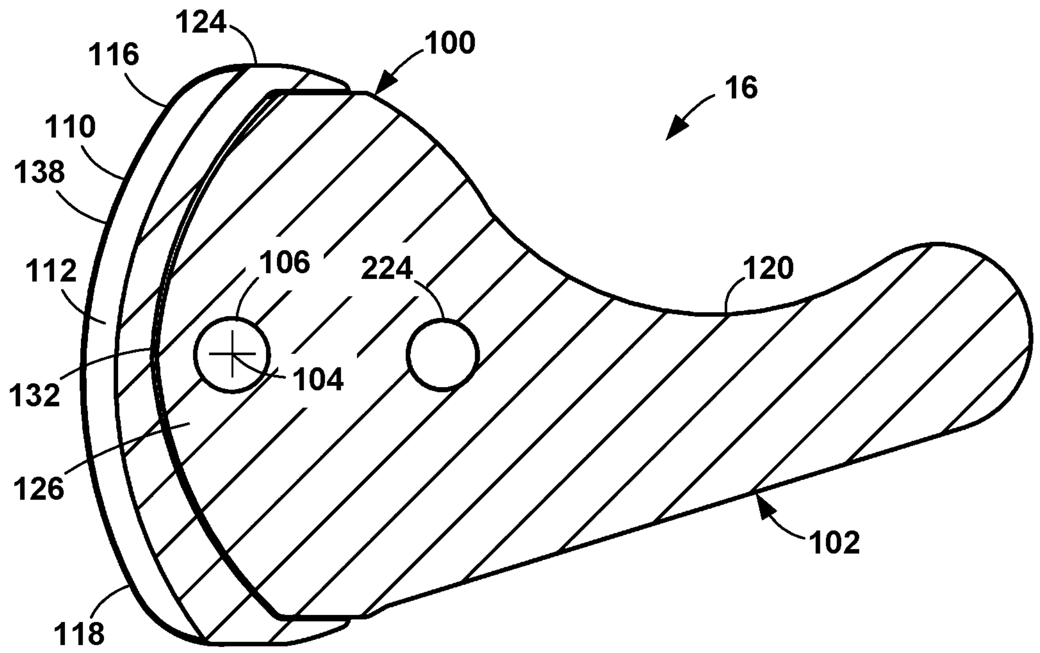
FIG. 16 is a side, cross-sectional view of the adjustable configuration of FIG. 14 in the large rope configuration.
Figure 17:
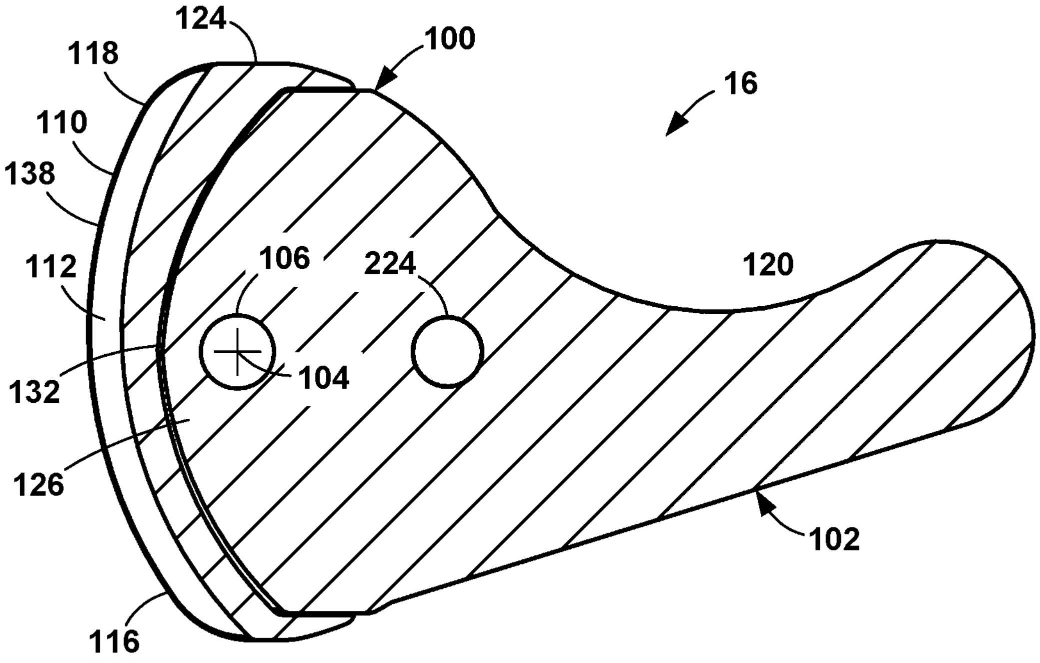
FIG. 17 is a side, cross-sectional view of the adjustable configuration of FIG. 14 in the small rope configuration.

Optionally, as with configuration of FIGS. 14 and 15, the rocker base 310 has a rocker base surface 338 with a similar curvature as the cap surface 330 but for a larger diameter rope. When the cap 308 is not installed, the operative surface 138 is on the rocker base surface 338.

Optionally, each end 332, 334 of the rocker surface 330 is shaped for ropes of different structures, as in the configuration of FIGS. 14-17. To change from one rope structure to the other, the cap 308 is removed, reversed, and reinstalled. Optionally, there can be several caps 308 to swap out for different rope structures.

Figure 19:
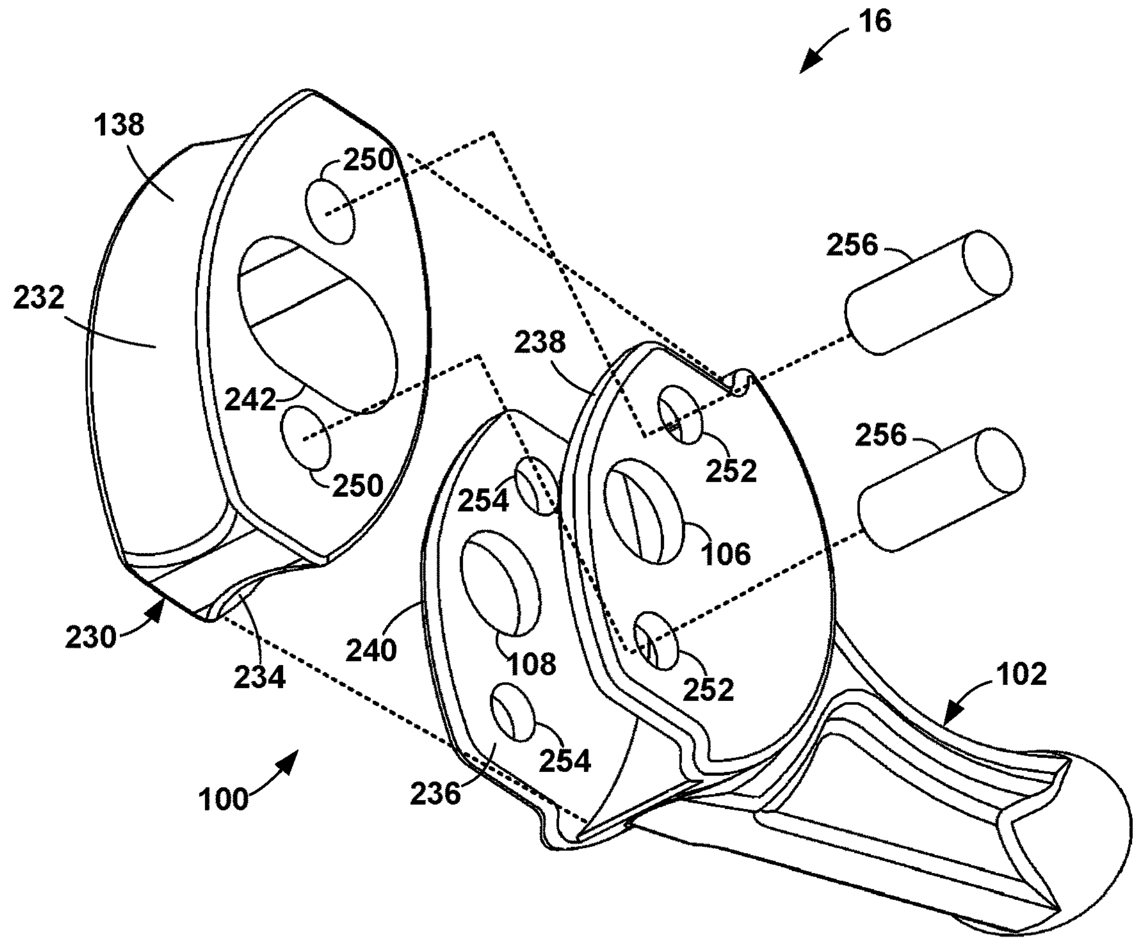
FIG. 19 is an exploded view of another configuration of an adjustable configuration of the cam.
Figure 20:
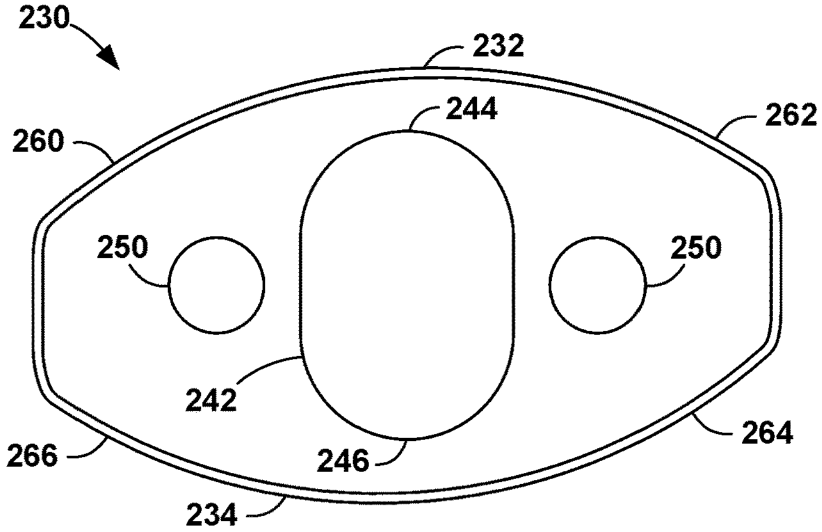
FIG. 20 is a side view of the cap of FIG. 19.
Figure 21:
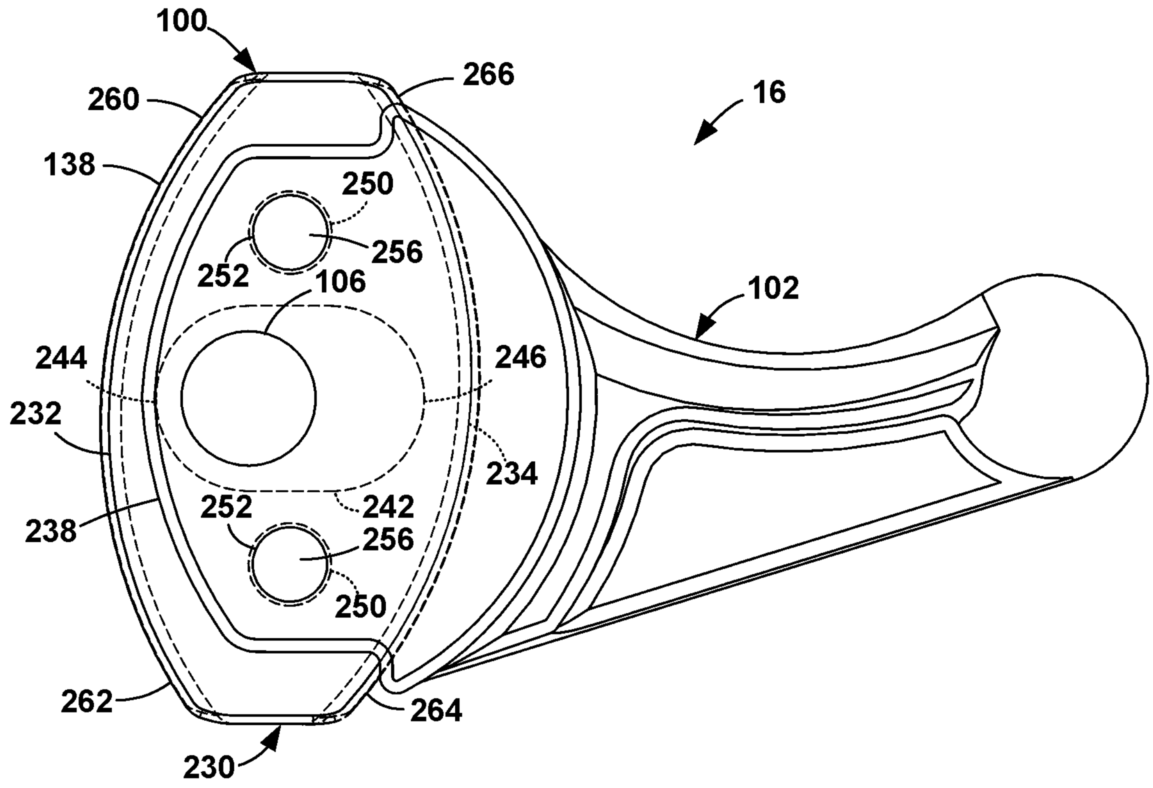
FIG. 21 is a side, partial phantom view of the adjustable configuration of FIG. 19.

A third changeable configuration is shown in FIGS. 19-21. A cap 230 has two opposed rocker surfaces 232, 234, and fits into a cradle 236 formed by a pair of opposed walls 238, 240 extending away from the lever 102. The threaded holes 106, 108 are in the opposed walls 238, 240. An oval hole 242 extends through the cap 230. When one rocker surface 232 is in the cradle 236, one side 244 of the oval hole 242 is aligned with the threaded holes 106, 108 and when the other rocker surface 234 is in the cradle 236, the other side 246 of the oval hole 242 is aligned with the threaded holes 106, 108. The oval hole 242 provides clearance for the screws 182, 184.

Optionally, as with the cap 230 described above, each end 260, 262, 264, 266 of the rocker surfaces 232, 234 is shaped for ropes of different structures, as in FIG. 20. To change from one rope structure to another, the cap 230 is removed, reversed and/or flipped, and reinstalled. Optionally, there can be several caps 230 to swap out for different rope structures.

In the illustrated configuration, the cap 230 is secured in the cradle 236 by a pair of pins 256. The pins 256 extend through holes 252 in one cradle wall 238, through an aligned hole 250 in the cap 230, and through an aligned hole 254 in the other cradle wall 240.

In another configuration that is applicable to all of the changeable configurations, the cap 230 is secured in the cradle 236 by ball plungers mounted within the cap 230. Spring-biased spheres in the cap 230 pop into holes in the cradle walls 238, 240. Alternatively, the ball plungers are mounted to the cradle walls 238, 240 and the cap 230 has the holes that the plungers pop into.

Figure 8:
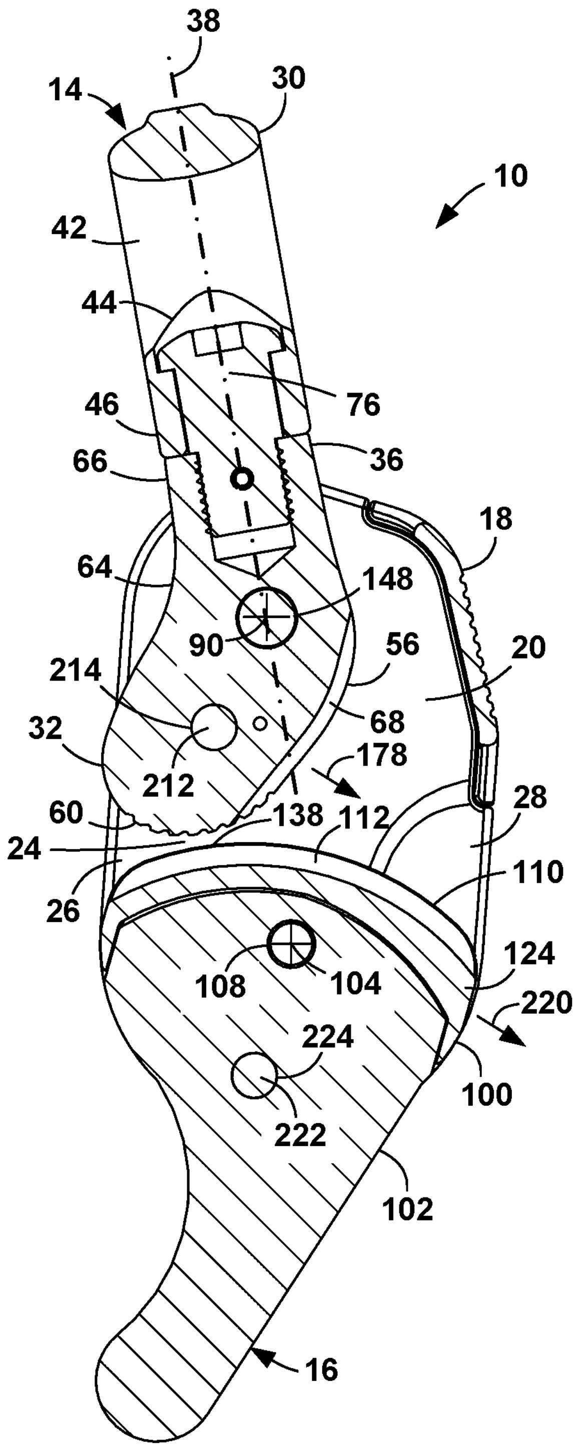
FIG. 8 is a side, cross-sectional view of the rope grab taken a A-A of FIG. 2.
Figure 9:
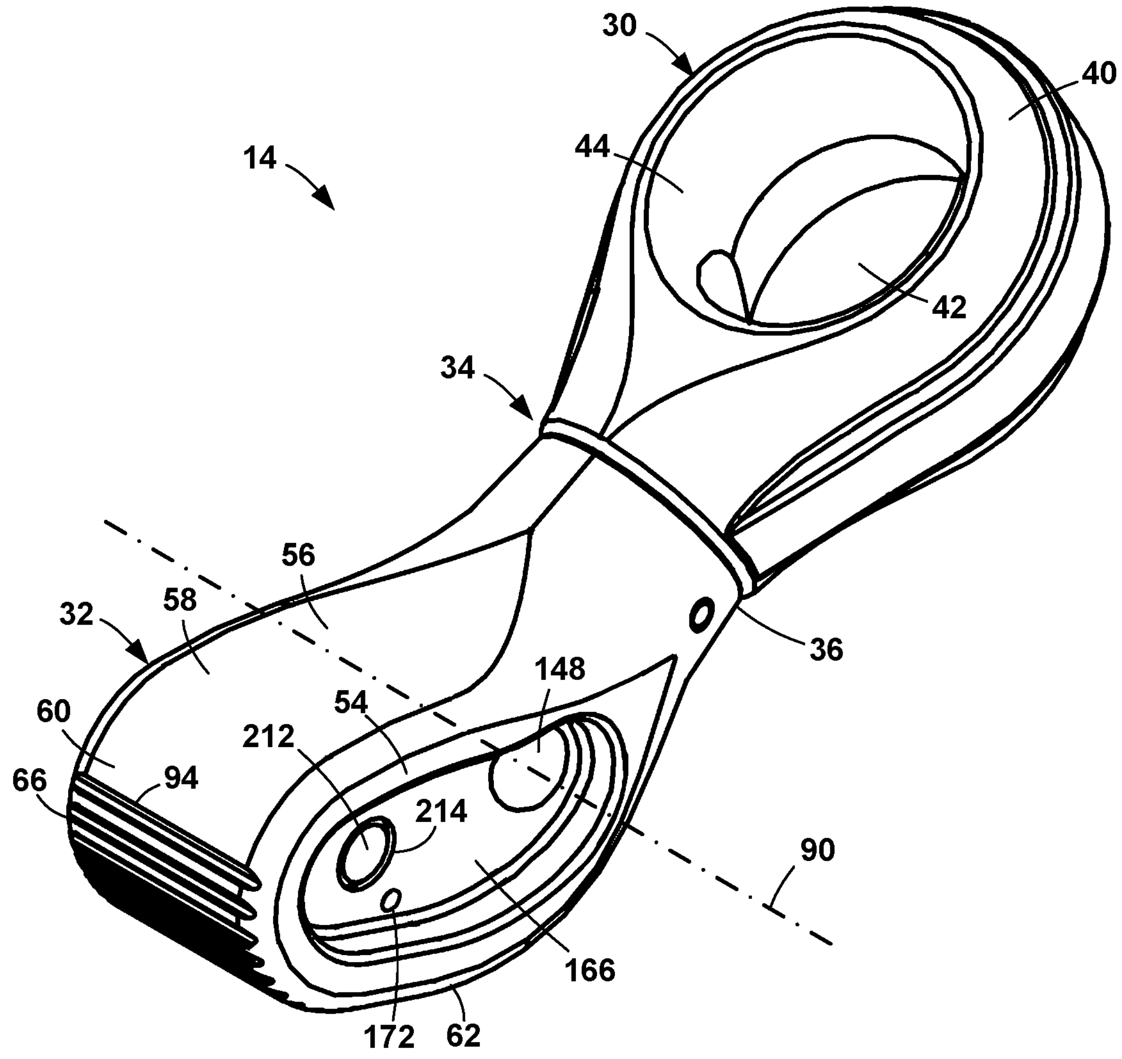
FIG. 9 is a perspective view of the brake.

The brake 14 and cam 16 are held in the correct position relative to each other by the housing 12. The housing 12 has a first wall 20 and a second wall 22 parallel to the first wall 20 between which the foot 32 and rocker 100 reside. The brake 14 is mounted to pivot on a brake axis 90 and the cam 16 is mounted to pivot on the cam axis 104 which is parallel to the brake axis 90. The eye 30 and lever 102 extend in generally opposite directions outside the walls 20, 22. The toe 60 and operative surface 138 form a rope slot 24 therebetween. The rope slot 24 has two ends through which a rope 3 extends. The end at the toe 60, on the left in FIG. 8, is the proximal end 26 and the end away from the toe 60, on the right in FIG. 8, is the distal end 28.

The optional U-shaped bridge 18 serves as a place to rest the heel of the hand when squeezing the lever 102 to release the cam 16 and/or turning the rope grab 10 to release the brake 14, as described below. Lateral ridges 156 texture the bridge body 150 to provide grip so the user's hand is less likely to slip off when applying pressure.

Figure 4:
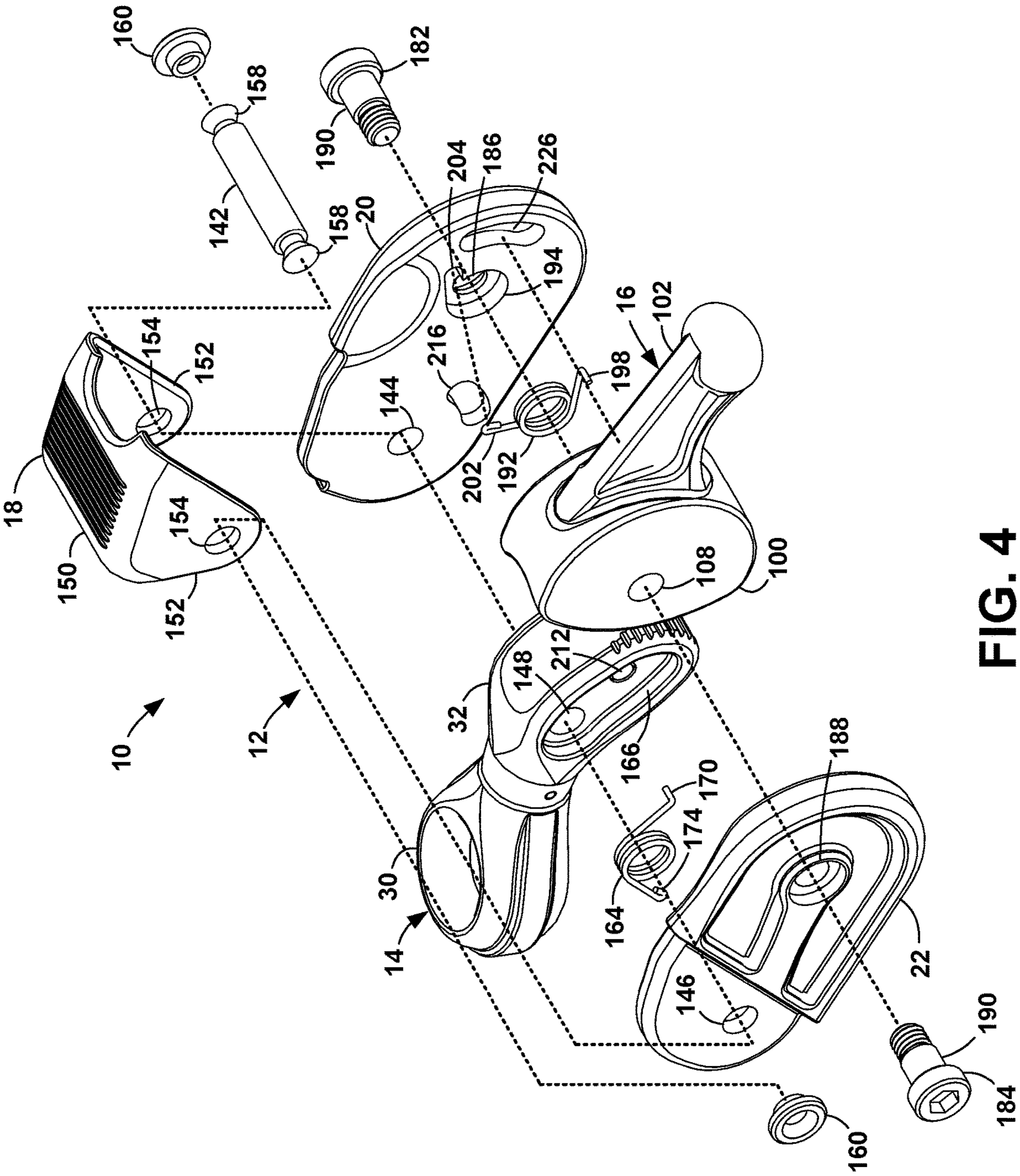
FIG. 4 is an exploded view of the rope grab showing configurations of several elements.
Figure 6:
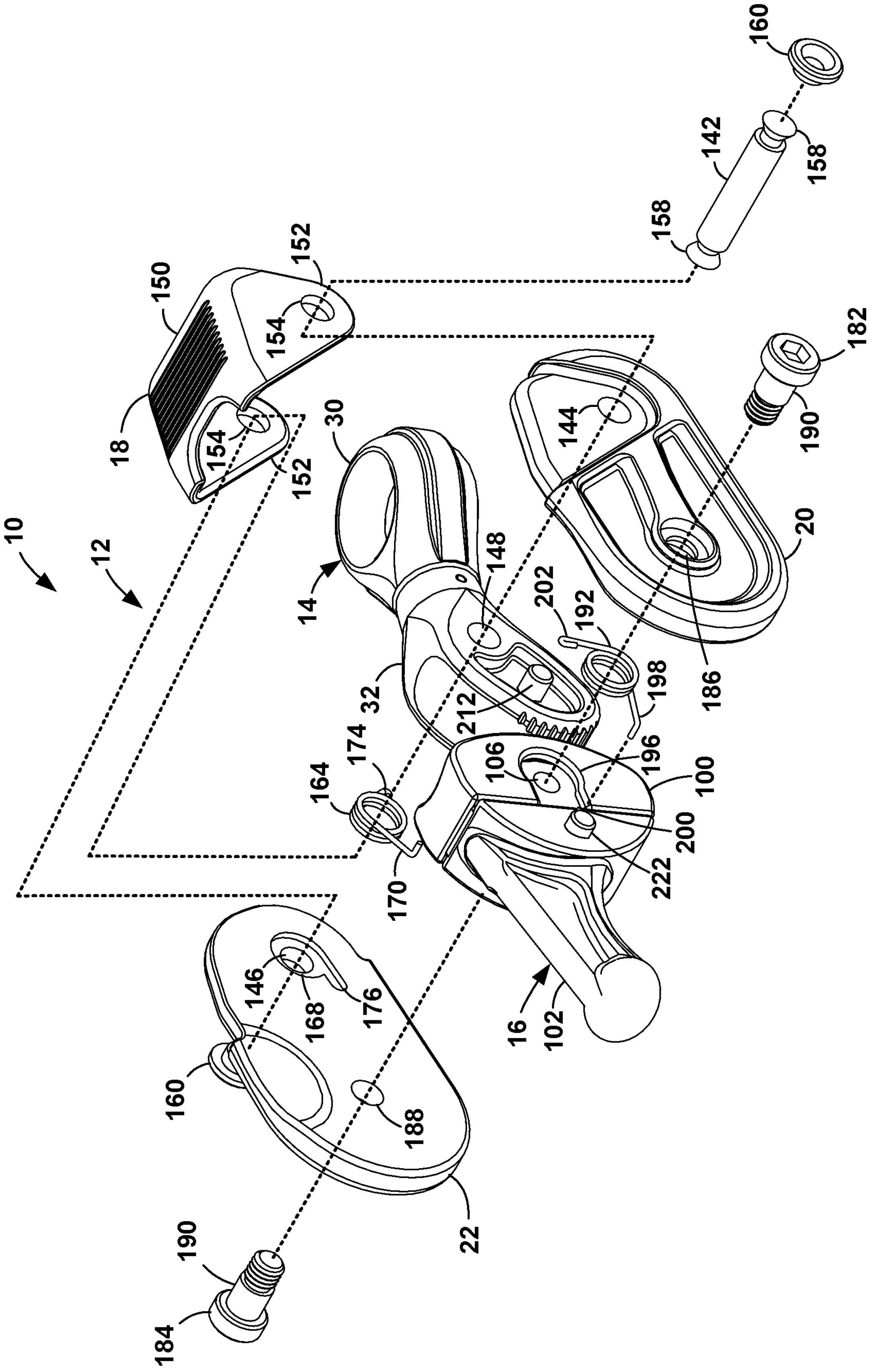
FIG. 6 is another exploded view of the rope grab showing configurations of several elements.

For the brake 14, in the configuration shown in FIGS. 4 and 6, a brake axle 142 extends through a brake axle hole 144 in the first wall 20, through a pivot hole 148 in the brake 14 on the brake axis 90, and through a brake axle hole 146 in the second wall 22. The brake pivot hole 148 intersects the beam axis 38 at the foot end 64 of the beam 36 where the foot 32 angles away from the beam 36. The bridge 18 straddles the outside of the walls 20, 22 and the axle 142 extends through holes 154 in the bridge legs 152 extending from the bridge body 150. The brake axle 142 is secured in place by whatever means is appropriate to keep the assembly together. Examples include by caps 160 or nuts on the axle ends 158, and by swaging or otherwise widening the axle ends 158.

Figure 5:
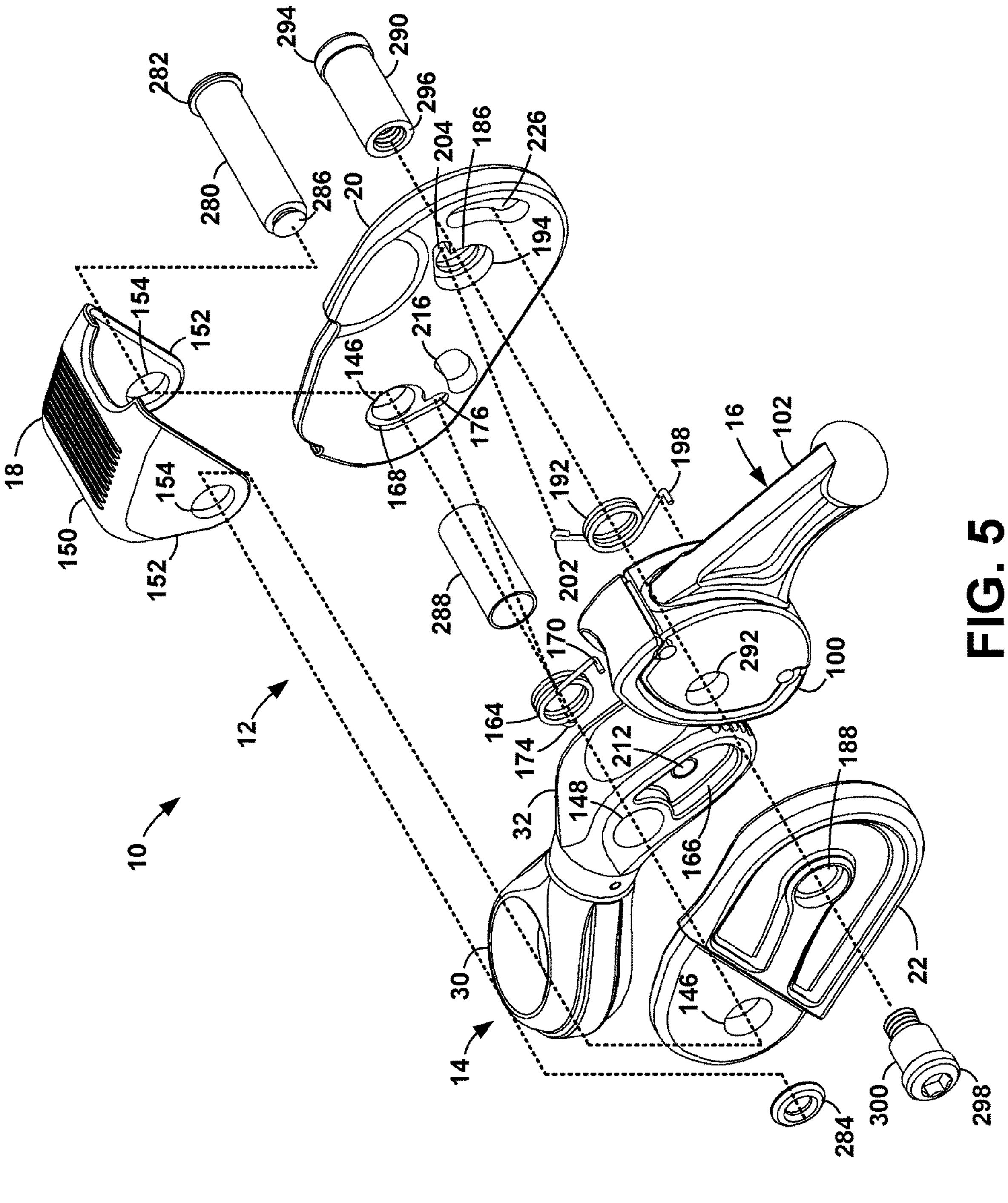
FIG. 5 is an exploded view of the rope grab showing configurations of several elements.
Figure 7:
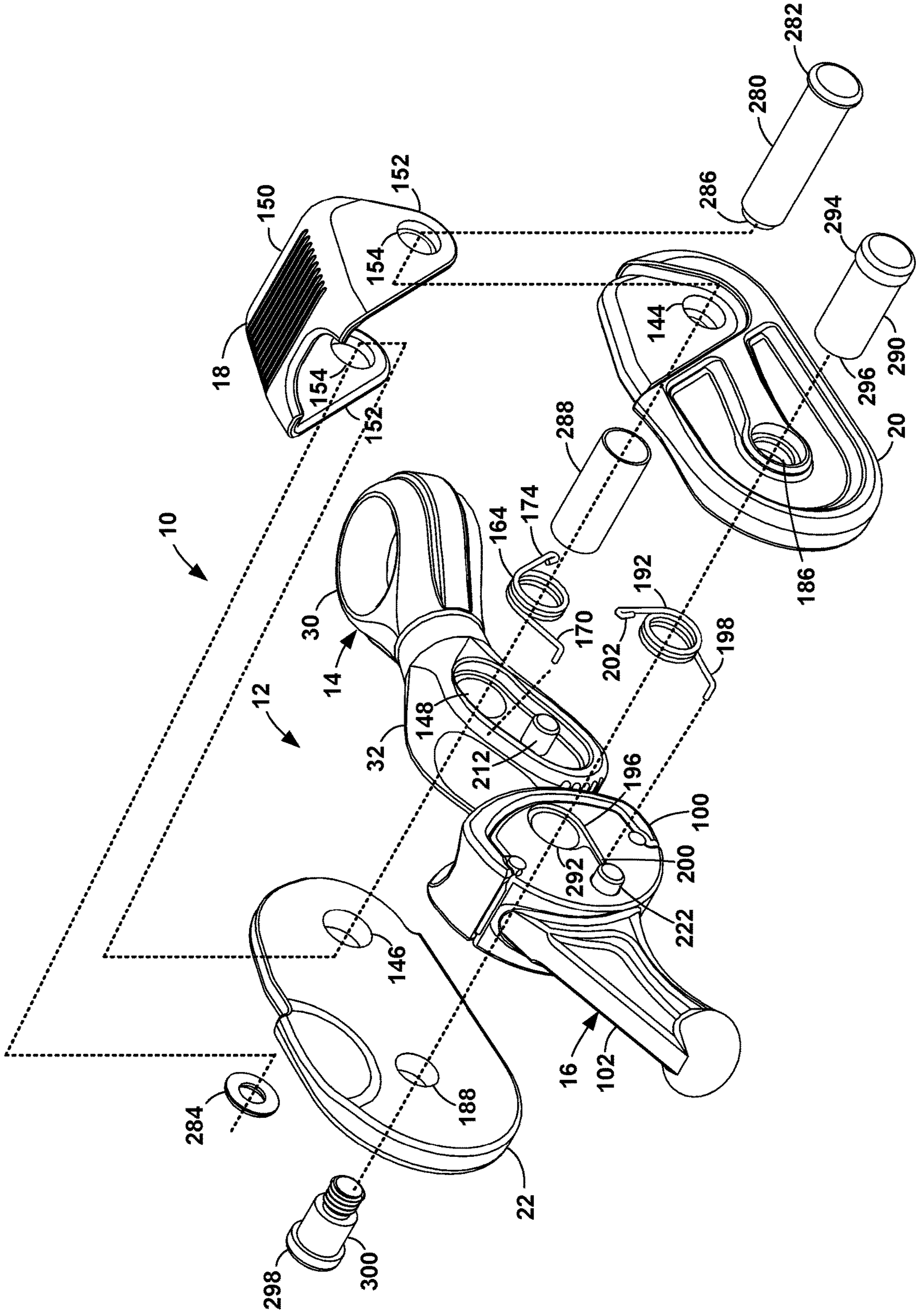
FIG. 7 is another exploded view of the rope grab showing configurations of several elements.

In the configuration shown in FIGS. 5 and 7, a brake axle 280 extends through the brake axle hole 144 in the first wall 20, through the pivot hole 148 in the brake 14 on the brake axis 90, and through the brake axle hole 146 in the second wall 22. As in the previous configuration, the bridge 18 straddles the outside of the walls 20, 22 and the brake axle 280 extends through the holes 154 in the bridge legs 152. The brake axle 280 is secured at one end by a head 282 and at the other end 286 by whatever means is appropriate, such as by a cap 284 or nut, or by swaging or otherwise widening the axle end 286. Optionally, the axle 280 extends through a sleeve 288 that extends through the brake axle holes 144, 146 and the brake pivot hole 48.

Any configuration that provides an axle where the brake 14 can pivot relative to the housing 12 is contemplated by the present invention. Examples include an axle with swaged ends, an axle with a cotter pin, a long rivet, an axle with externally threaded ends and nuts, an axle with internally threaded ends and screws.

An optional spring 164 biases the brake toe 60 toward the operative surface 138, as at 178 in FIG. 8 and as described below. In one configuration, shown in FIGS. 4 and 6, the torsion spring 164 fits into a depression 166 in the foot side 54 that surrounds the pivot hole 148 and in a depression 168 in the inside of the second wall 22 surrounding the axle hole 146. In another configuration, shown in FIGS. 5 and 7, the torsion spring 164 fits into a depression 166 in the foot side 54 that surrounds the pivot hole 148 and in a depression 168 in the inside of the first wall 20 surrounding the axle hole 146. In both configurations, one of the spring legs 170 fits into a hole 172 in the foot depression 166 to anchor the spring 164 to the foot 32. The other spring leg 174 extends into a tangential finger 176 off the first wall depression 168 to anchor the spring 164 to the appropriate wall 20, 22. The spring 164 is retained in place by the brake axle 142, 280 or sleeve 288.

Optionally, a stop prevents the brake 14 from rotating too far in either direction. The stop includes a pin 212 in a hole 214 in the foot 32. Alternatively, the pin 212 is formed integrally with the foot 32. The pin 212 rides in a curved slot 216 in the first wall 20, where the ends of the slot 216 dictate the rotation limit of the brake 14.

As indicated above, the cam 16 is mounted to pivot on the cam axis 104 within the walls 20, 22. In the one configuration, shown in FIGS. 4 and 6, a first screw 182 extends through a first cam pivot hole 186 in the first wall 20 and into the threaded hole 106 on the cam axis 104 in the rocker 100 in the adjacent side. A second screw 184 extends through a second cam pivot hole 188 in the second wall 22 and into the second threaded hole 108 on the cam axis 104 in the rocker 100 in the adjacent side. The portion 190 of the screw 182, 184 in the wall hole 186, 188 is smooth so that the screw 182, 184 rotates within the wall hole 186, 188 as the cam 16 pivots.

In the configuration shown in FIGS. 5 and 7, a cam axle 290 extends through the first cam pivot hole 186 and press fits into a pivot hole 292 in the rocker 100 on the cam axis 104. The cam axle 290 rotates in the first cam pivot hole 186 as the cam 16 pivots. A head 294 on the cam axle 290 secures the first wall 20. A screw 298 fits through the second cam pivot hole 188 and turns into the threaded end 196 of the cam axle 290. The portion 300 of the screw 298 in the wall hole 188 is smooth so that the screw 298 rotates within the wall hole 188 as the cam 16 pivots.

Any configuration that provides an axle where the cam 16 can pivot relative to the housing 12 is contemplated by the present invention. Examples include an axle with swaged ends, an axle with a cotter pin or clevis pin, a long rivet, an axle with externally threaded ends and nuts, an axle with internally threaded ends and screws.

An optional spring 192 biases the operative surface 138 toward the toe 60, as at 220 in FIG. 8 and described below. The torsion spring 192 fits into a depression 194 in the inside of the first wall 20 surrounding the first wall hole 184 and a depression 196 in the inside of the rocker 100 surrounding the first threaded hole 106. One spring leg 198 fits into a hole 200 in the rocker depression 196 to anchor the spring 192 to the rocker 100. The other spring leg 202 extends into a tangential finger 204 off the first wall depression 194 to anchor the spring 192 to the first wall 20. The spring 192 is retained in place by the first screw 182.

If the rocker 100 has the cap 124 of FIGS. 14-17, the corresponding slot 130 in the side 128 of the cap 124 is wide enough, as at 206, to accommodate the spring 192. If the cap 124 is designed to accommodate two different rope sizes, both slots 130 are wide enough to accommodate the spring 192. In such a case, a spacer 208 fits into the wide region 206 of the slot 130 to reduce the slot size for the screw 184, as shown in FIG. 15.

Optionally, a stop prevents the cam 16 from rotating too far in either direction. The stop includes a pin 222 in a hole 224 in the rocker 100. Alternatively, the pin 222 is formed integrally with the cam 16. The pin 222 rides in a curved slot 226, where the ends of the slot 226 dictate the rotation limit of the cam 16.

Optionally, the second wall 22 can swing open by pivoting on the brake axis 90 so that the user can load/unload the rope and/or to remove/swap/reverse the cap 124. To permit this, that fastener at the second wall end of the cam axle is removable. In the configuration of FIGS. 4 and 6, the second screw 184 is removable. In the configuration of FIGS. 5 and 7, the screw 298 is removable. In other configurations, the fastener, such as a cotter pin, clevis pin, or nut, is removable.

The housing 12, brake 14, cam 16, and bridge 18 are composed of rigid, robust materials, such as a plastic, composite, or metal. Preferably, the surfaces that contact the rope are composed of a material that does not wear significantly during use. For example, if the cam 16 has a cap 124, 230, 308, the cap can be composed of a metallic material, while the remainder of the cam 16 is composed of a plastic, and if the brake 14 has a removable toe 92, the removable toe 92 can be composed of a metallic material, while the remainder of the brake 14 is composed of a plastic.

Figure 22:
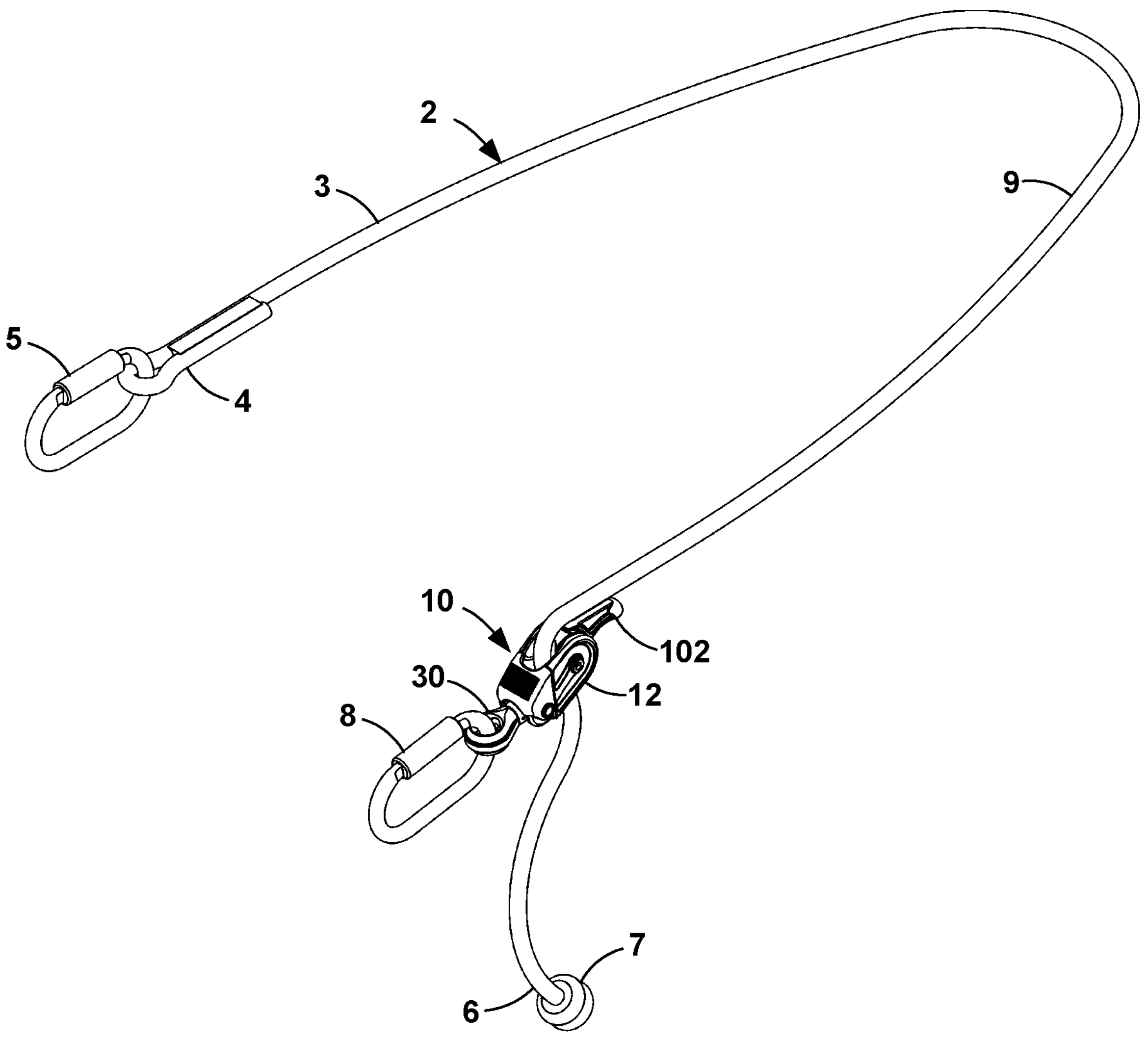
FIG. 22 is a perspective view of the rope grab on a lanyard.

FIG. 22 shows the rope grab 10 installed in a typical configuration on a rope lanyard 2. The distal end 4 of the lanyard 2 is equipped with a carabiner 5, snaphook, or other connector by means of a sewn eye, splice, or knot. The proximal end 6 has a stopper knot or other termination 7 to prevent the rope grab 10 from slipping off the end of the rope 3. The present invention also contemplates use of a rope grab 10 on a rope other than a lanyard configuration.

Figure 23:
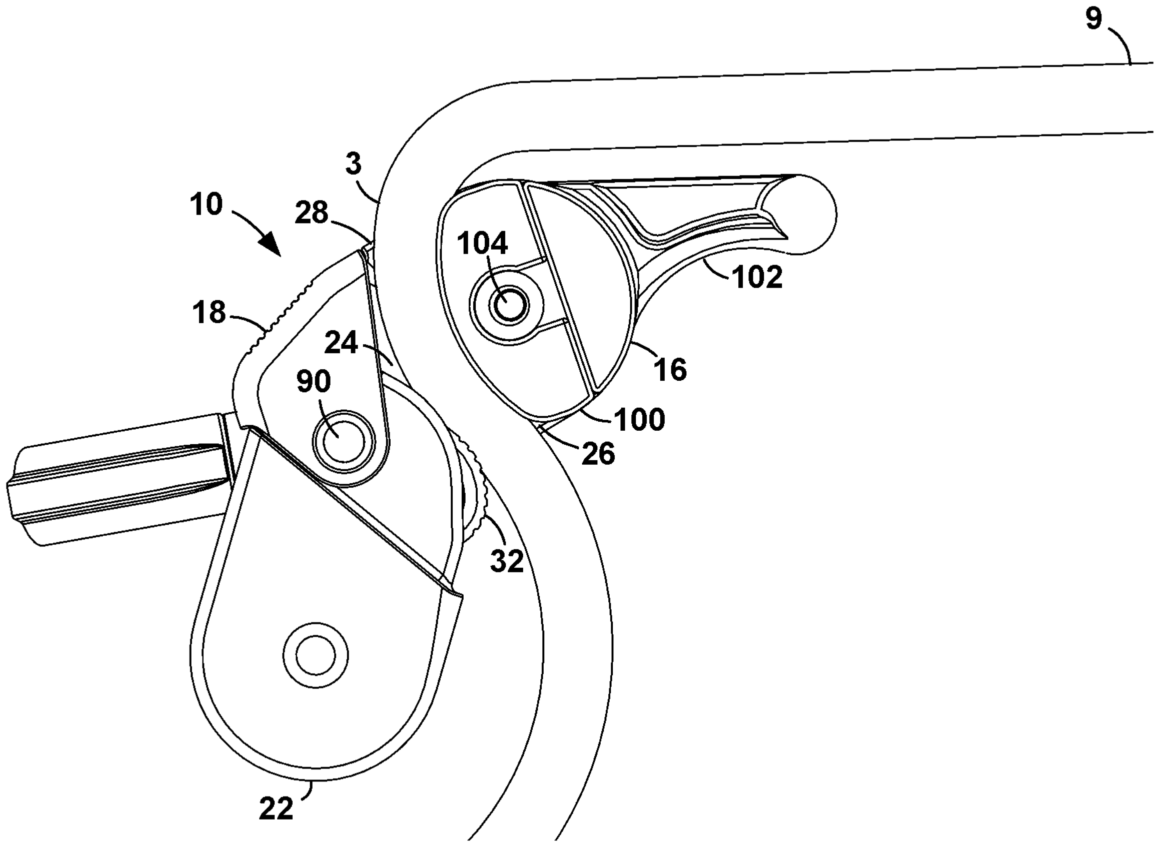
FIG. 23 is a side view of the rope grab being installed on a rope.

The rope grab 10 is installed on the rope 3 as shown in FIG. 23. Because the ends 4, 6 of the lanyard 3 typically have a sewn eye, knot, or other means of termination, it may not be possible to thread the rope 3 directly into the rope slot 24 between the foot 32 and rocker 100. The second screw 184 or screw 298 is removed and the second wall 22 is pivoted away from the cam 16. The rope 3 is placed in a rope slot 24 between the toe 60 and the rocker 100. The second wall 22 is pivoted back and the second screw 184 or screw 298 is reinstalled to capture the rope 3 in the rope slot 24, as in FIG. 24.

Opening the side wall 22 also allows the user to reconfigure the operative surface 138 of the cap 124, 230 based on user preference of line compatibility and user weight. The cap 124 of FIGS. 14-17 and the cap 308 of FIG. 18 can be oriented in one of two directions or can be removed completely to expose the rocker base surface 132, 338, so there are three unique braking configurations. The cap 230 of FIGS. 19-21 can be installed in one of four orientations, so there are four unique braking configurations. The present invention contemplates that more or fewer configurations are possible based upon the shape of the cap 124, 230, 308. The rope grab 10 can also have interchangeable parts, such as the cap 124, 230, 308, foot 32, and or toe 92 to further expand the number of possible configurations.

In typical use, the eye 30 is attached to one side of the user's harness with a carabiner 8 or other connector. The distal end 4 is wrapped around a tree, anchor or other fixed object and connected to the opposite side of the user's harness by a carabiner 5. Optionally, the distal end 4 is directly clipped to an anchor or choked around an anchor point and connected back to the rope 2 with the carabiner 5 and the eye 30 is attached to a centered connection point on the user's harness.

When force is applied to the eye 30, the brake 14 rotates about the brake axis 90 until the foot 32 pinches the rope 3 against the operative surface 136. At the same time, the distal end 4 of the rope 3 is tensioned, rotating the rocker 100 to pinch the rope 3 against the toe 60. Now the rope grab 10 can be used to adjust the length of the rope 3.

Figure 24:
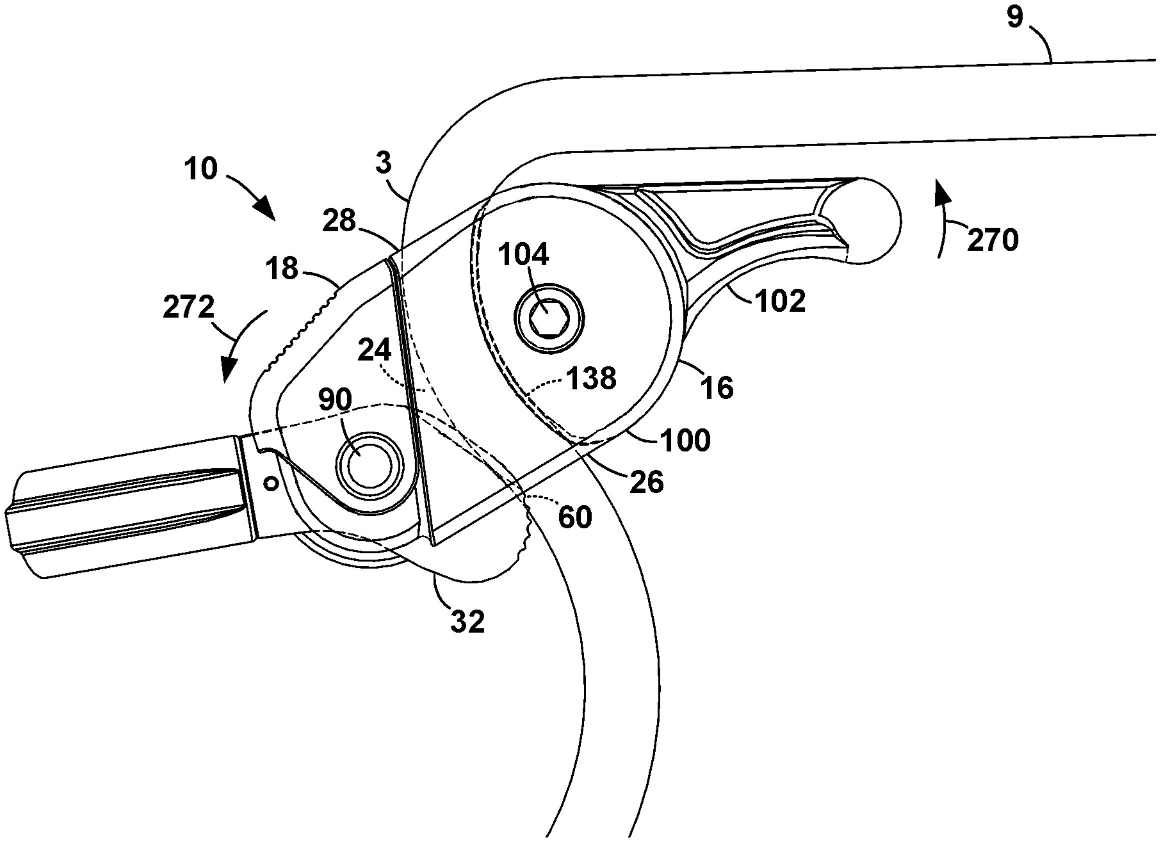
FIG. 24 is a side, partial phantom view of the rope grab installed on a rope.

To release slack and lengthen the rope 3, the lever 102 is squeezed toward the distal end 28 of the rope slot 24, as at 270 in FIG. 24, and/or the housing 12 is rotated away from the toe 32, as at 272 in FIG. 24, resulting in the eye 30 pivoting toward the distal end of the slot 28. These motions ease the pinching pressure on the rope 3 so that the rope 3 can slide through the rope slot 24, enabling the rope grab 10 to slide or be pulled away from the distal end 4.

The curve of the operative surface 138 allows the pinching force against the rope 3 to be modulated by the user so that the length can be adjusted while under load.

To take up slack and shorten the distal end 4 of the rope 3, the proximal end 6 of the rope 3 is held and pushed toward the distal end 4, causing the rocker 100 to rotate. Rotating the rocker 100 eases the pinching pressure on the rope 3. At the same time, the user must reduce the force being applied to the brake 14 via the eye 30, which eases the pinching pressure so the rope 3 can slide through the rope slot 24 toward the proximal end 6.

Thus, it has been shown and described a rope grab. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A rope grab comprising:

(a) a housing with a first wall and a second wall parallel to the first wall;

(b) a brake having a beam with a beam axis, a foot angled from a foot end of the beam, and an eye at an eye end of the beam, the foot having a brake surface with a rounded toe opposite the beam, the brake mounted between the first wall and the second wall to pivot on a brake axis at the beam end and perpendicular to the beam axis;

(c) a cam having a rocker and a lever extending from the rocker, the rocker having a surface generally opposite the lever that curves about a cam axis to form an operative surface, the cam mounted to pivot between the first wall and the second wall on the cam axis parallel to the brake axis; and (d) a rope slot between the toe and operative surface having a proximal end and a distal end;

(e) whereby when a rope extending through the rope slot is pulled toward the distal end of the slot, the rope is pinched and captured between the toe and the operative surface by friction with the toe and operative surface, and when either the lever pivots toward the distal end of the rope slot and/or the housing rotates such that the eye pivots toward the distal end of the rope slot, the friction can be modulated to control how the rope slides through the rope slot.

2. The rope grab of claim 1 wherein the foot and eye swivel relative to each other on the beam axis.

3. The rope grab of claim 1 wherein the toe is textured.

4. The rope grab of claim 1 wherein the foot has a rounded cutout extending between the toe and the beam that is adapted to center a rope on the foot.

5. The rope grab of claim 1 wherein the operative surface has a rounded groove that is adapted to center a rope on the rocker surface.

6. The rope grab of claim 1 wherein the rocker surface is on a cap removably attached to a rocker base.

7. The rope grab of claim 6 wherein the cap can be reoriented such that a different portion of the rocker surface is the operative surface.

8. The rope grab of claim 6 wherein the rocker base has an operative surface.

9. The rope grab of claim 1 wherein the brake has a stop to limit the amount of brake pivot.

10. The rope grab of claim 1 wherein the cam has a stop to limit the amount of cam pivot.

11. The rope grab of claim 1 further comprising a brake spring to bias the toe toward the operative surface.

12. The rope grab of claim 1 further comprising a cam spring to bias the operative surface toward the toe.

13. The rope grab of claim 1 further comprising a bridge that spans the first wall and the second wall.

14. The rope grab of claim 1 wherein the second wall can pivot on the brake axis away from the cam axis to provide access to the rope slot.

15. The rope grab of claim 1 wherein the cam is mounted to pivot by a first screw through a hole in the first wall turned into a first threaded hole on the cam axis in the rocker and a second screw through a hole in the second wall turned into a second threaded hole on the cam axis in the rocker.

16. The rope grab of claim 15 wherein the first screw is removable, and the wall rotates on the brake axis to provide access to the rope slot.

17. The rope grab of claim 1 wherein the cam is mounted to pivot by a cam axle through a hole in the first wall and press fit into a hole on the cam axis in the rocker and a screw through a hole in the second wall turned into a threaded end of the cam axle.

18. The rope grab of claim 17 wherein the screw is removable, and the second wall rotates on the brake axis to provide access to the rope slot.

19. The rope grab of claim 1 wherein the brake is mounted to pivot by an axle through a hole in the first wall, a hole through the brake on the brake axis, and a hole through the second wall.

* * * * *